3,055,945
PREPARATION OF METAL ORGANOBORON COMPOUNDS

Julian B. Honeycutt, Jr., Baton Rouge, La., assignor to Ethyl Corporation, New York, N.Y., a corporation of Delaware No Drawing. Filed Dec. 29, 1958, Ser. No. 783,073
7 Claims. (Cl. 260—606.5)

This invention is concerned with the preparation of metal organoboron compounds particularly the alkali and alkaline earth tetraorganoboron compounds.

It has been known that alkali metal organometallic compounds can be reacted with alkyl boranes to give the corresponding alkali metal tetraalkylboron derivatives. For example, lithium tetraphenylboron has been obtained from the reaction of phenyllithium with triphenylborane. So far as now known this procedure is the only method by which such compounds have been obtainable. The process suffers particular inherent disadvantages, however, most notable of which is the costly and difficultly prepared organo alkali metal compound with which the alkyl borane is reacted. Likewise somewhat erratic results have been obtained in that in some instances the desired reaction has not proceeded. It is therefore desirable to provide a more efficient and economical process for the manufacture of metal organoboron compounds, especially the metal tetraorganoboron compounds.

Accordingly, an object of this invention is to provide a new and novel process for the manufacture of metal organoboron compounds. A particular object is to provide a novel process for the manufacture of alkali and alkaline earth tetraalkylboron compounds. A further object is to provide such products in higher yield and purity. A still further object is to provide novel compositions of matter of metal organoboron compounds. These and other objects will be evident as the discussion proceeds.

It has been found that metal organoboron compounds can be obtained by reacting an alkali or alkaline earth organoboron hydride with an olefin in the presence of an organo group III-A metal compound as a catalyst. The alkali metal alkyl boron hydrides, especially those of sodium, along with the terminal unsaturated straight chain olefins having up to about 6 carbon atoms and the fully alkylated alkyl boron compounds, especially triethylborane, are preferred alkali metal organoboron hydrides, olefins, and catalysts respectively. Some advantage is achieved when the reaction is conducted in the presence of a solvent or liquid diluent, especially the ethers. The reaction is preferably conducted at a temperature between about 100 to 175° C. and a pressure between 500 to 5000 p.s.i. Thus, an especially preferred embodiment of this invention comprises the reaction of sodium triethylborohydride with ethylene in the presence of a minor amount of triethylboron at a temperature between about 100 to 175° C. and a pressure between 500 to 5000 p.s.i. A still further preferred embodiment is that wherein the aforementioned reaction is conducted in the presence of an ether particularly an ether of a polyhydric alcohol capable of complexing with the sodium tetraethylboron produced. In a still further embodiment the alkali or alkaline earth organoboron hydride is prepared in situ by reacting an alkali or alkaline earth metal hydride with an organoboron compound, preferably in the presence of a hydrocarbon or ether, while simultaneously reacting with the olefin and catalyst as described above.

The present invention is of particular advantage over the prior art techniques in providing the alkali or alkaline earth metal organoboron compound in higher yield and purity than heretofore available. Further, the employment of the costly and difficult to prepare organo alkali metal compounds is eliminated. Additionally, the process is less hazardous than the prior art techniques and results in highly pure products in short reaction times. Likewise, the process provides novel compositions of the alkali and alkaline earth organoboron compounds complexed with ethers. These products are particularly unique in that they are more stable, and easier to handle than the uncomplexed materials. Other advantages of the process and products of this invention will be evident as the discussion proceeds.

In that embodiment where a metal organoboron hydride which has been preformed is employed, it is preferred that it be an alkali or alkaline earth organoboron hydride. Particular criteria of this reactant are that it have at least one hydrogen atom bonded to the boron, at least one carbon atom of an organic radical, preferably alkyl or aryl hydrocarbon radicals, bonded to the boron and contain another metal selected from the alkali and alkaline earth metals. Any unsatisfied valences can be satisfied by organic radicals in general and other functional groups which are essentially inert in the reaction, for example halides, and the like groups. Typical examples of the metal organoboron hydride reactant include sodium trimethylborohydride, sodium triethylborohydride, sodium trioctylborohydride, sodium tricyclopentylborohydride, lithium tricyclohexylborohydride, calcium bis-(tri-methylcyclohexylborohydride), magnesium bis-(triethylborohydride), sodium triphenylborohydride, sodium tribenzylborohydride, sodium diethylbromoborohydride, sodium diphenylchloroborohydride, sodium diethylboron dihydride and the like compounds wherein other alkali and alkaline earth metals, e.g. potassium, strontium, barium, beryllium, calcium, and magnesium are substituted for the metals in the above compounds and other alkyl, cycloalkyl, and aryl radicals are employed. In general, the hydrocarbon groups of such compounds can be further substituted provided such substituents are inert in the reaction. The metal organoboron hydride compounds which contain only the group I-A or II-A metal, boron, at least one hydrocarbon radical, and at least one hydrogen atom bonded to the boron are particularly preferred. Of the hydrocarbon radicals the straight chain alkyl radicals having up to about 10 carbon atoms are particularly preferred along with the alkali metals, especially sodium, in view of their greater applicability and easier formation. A particularly preferred embodiment of this reactant is the sodium trialkyl hydrocarbon boron hydride compounds, especially sodium triethylborohydride.

The olefin which is employed is, in general, an organic compound having a double bond between two carbon atoms. Typical examples of such olefins include ethylene, propylene, 2-butene, 1-butene, 1-pentene, 2-pentene, 3-hexene, the octenes, 1-diisobutylene, trimethylethylene, the decenes, 1-tetradecene, 1-octadecene, cyclic olefins such as cyclopentene, cyclohexene, pinene, substituted olefins such as 1,1-diphenylethylene, styrene, vinyl butyl ether, dienes, such as butadiene, and cyclohexadiene and the polyenes such as alloocimene and the like. In general such olefins will contain up to about 18 carbon atoms. It is to be understood that they can be further substituted with functional groups which are essentially inert in the reaction system. The hydrocarbon straight chain olefins having terminal or α-unsaturation are particularly preferred because of their greater availability and reactivity in the process. Such olefins having up to about 6 carbon atoms especially ethylene comprise an especially preferred embodiment.

The catalyst which is employed in conducting the process of this invention is an organometallic group III-A compound wherein the group III-A element is one from the Periodic Chart of the Elements as set forth at pages 56 and 57 of Handbook of Chemistry, Lange, 8th Ed., Handbook Publishers, Inc., 1952. Typical examples of such compounds include for example, boron compounds such as trimethylboron, triethylboron, trihexylboron, trioctylboron, tricyclopentylboron, tricyclohexylboron, trimethylcyclohexylboron, diethylboron bromide, dimethyl diborane, triethylboron-trimethylamine, trioctylboron-triethylamine, trioctadecylboron, tricyclohexylboron, triphenylboron, tribenzylboron, diphenylboron hydride, diphenylboron chloride, naphthyl boron dichloride and similar such compounds wherein aluminum, gallium, indium, and thallium are substituted for boron. The aluminum and boron compounds especially boron, are most suitable as catalysts. Further the fully alkylated aluminum or boron compounds are more particularly preferred because of their greater effectiveness in the process. The trialkyl boranes having up to about 6 carbon atoms in each alkyl group comprise an especially preferred embodiment.

The proportions of the reactants are not critical so long as at least a minor amount of the catalyst is present. For convenience this constituent is based upon the metal organoborohydride compound. In general at least about 0.001 mole of the catalyst per mole of the metal organoboron hydride are employed. Although higher amounts can be used generally not more than about 0.25 mole of the catalyst is employed per mole of the metal organboron hydride compound. In a particularly preferred embodiment between about 0.05 to 0.15 mole of the catalyst per mole of the metal organoboron hydride compound are employed since faster reaction rates are obtained when the reaction is conducted employing this range of catalyst. The olefin is generally present at least in amount sufficient to react with the hydride bond. Thus in this sense when the olefin is gaseous it can be pressurized into the system or bubbled through the reaction media and any excess can be recovered. Generally between the stoichiometric amount and 5 percent in excess thereof of the olefin required to react with the hydride bonding in the metal organoboron hydride compound is employed.

Some advantage is achieved when the reaction is conducted in the further presence of a liquid organic diluent. Such diluents are preferably essentially inert in the reaction with exception that those that will complex with the product or reactants can be employed since they will not hinder the desired result. Further criteria of such solvents are that they be liquid under the reaction conditions and preferably readily recoverable from the reaction system. Among the solvents which can be employed are included, for example, the hydrocarbons, ethers and amines. Among the hydrocarbons which can be employed are included the various alkanes, alkenes, cyclanes, cyclenes and aromatic compounds, including the mononuclear aromatic compounds, polynuclear non-fused ring and polynuclear fused ring aromatic compounds. When alkenes or cyclenes are employed as reactants an excess thereof can be used as diluent particularly in those instances wherein they are liquid under the condition of reaction. Typical examples of the alkanes which are employed include heptane, octane, nonane, up to and including about octadecane and the like, and their various branched chain isomers. Among the alkenes are included, for example, heptylene, octylene, and the like, up to and including about octadecylene and their various branched chain isomers. When the cyclanes are employed as diluents, they can be, for example, cycloheptane, cyclooctane, methylcyclohexane, dimethylcyclohexane, isopropylcyclopentane, and the like. Typical examples of the cyclenes include cycloheptene, cyclooctene, 1-isopropylcyclopentene-1, 1-methylcyclohexene-1, and the like. Similarly, various polycyclanes and cyclenes are employed as for example, cyclopentylcyclopentane; (2-methylcyclopentyl)-cyclohexane; cyclohexylcyclo hexane; decahydronaphthalene; 1,1'-dicyclopentenyl; 2,2'-dicyclohexenyl; 0,4,4-bicyclodecene-1; decahydro-fluorene; and the like. Typical examples of mononuclear aromatic compounds include toluene, ethylbenzene, the xylenes, 1,2-diethylbenzene, cyclopropylbenzene, the cymenes, and the like. When the diluents are polynuclear non-fused aromatic compounds they can be, for example, 1-methyl-2-phenylbenzene; 1,3-diphenylpropane; 1-phenyl-2-p-tolylethane; 1,1-diphenylheptane; and the like. When polynuclear fused ring aromatic compounds are employed they can be, for example, indane; 1-methylindane; indene; tetralin; 1,2-dihydronaphthalene; 1-methylnaphthalene; and the like. Generally speaking, the ethers can be non-aromatic, aromatic, and polyethers. The non-aromatic ethers include the monoaliphatic and mixed ethers. Typical examples of the monalophatic ethers which are employed are di-n-butyl either; di-sec-butyl ether; diisobutyl ether; di-n-amyl ether; di-n-heptyl ether; and the like saturated and unsaturated ethers. Examples of the mixed ethers which are employed are n-amylmethyl ether; tert-amylethyl ether; n-butylisopropyl ether; ethylisoamyl ether; n-butyl-n-propyl ether; and the like. The aromatic ethers include, for example, the mono aromatic ethers, alkyl aryl ethers, and the alkaryl alkyl ethers. Typical examples of the mono aromatic ethers include dibenzyl ether; diphenyl ether; and the like. When the aromatic ether is an alkyl aryl ether, one can employ, for example, methylphenyl ether; methyl-o,m, or p-tolyl ether; methyl-α-naphthyl ether; ethylphenyl ether; ethyl-o,m, or p-tolyl ether; ethyl-α-naphthyl ether; phenyl-n-propyl ether; isopropylphenyl ether; n-butyl-phenyl ether; n-butyl-o-tolyl ether; isoamyl-n-naphthyl ether; and the like. The alkaryl alkyl ethers which are employed can be, for example, benzylmethyl ether; benzyl ethyl ether; benzyl-n-butyl ether; and the like. Examples of the polyethers which are employed are those having the configuration $R-O-(CH_2)_n-O-R$ wherein R is an organic radical, preferably hydrocarbon or ether radicals, and $n$ is a small whole number as between about 1 to 10, preferably 1 to 3 inclusive. For example, such polyethers include ethylene glycol ethyl methyl ether; the diethyl ether of ethylene glycol; methyl-n-propyl ether of ethylene glycol; 1,4-dioxane; tetraethylene glycol dimethyl ether; glycerol trimethyl ether; dimethyl ether of diethylene glycol; dimethoxyethane, diethyl ether of diethylene glycol; and the like. Other polyethers which can be employed include, for example, pyrocatechol dimethyl ether; resorcinol dimethyl ether; 1,2,4-trimethoxybenzene, and the like. Included among the amines are the primary, secondary, tertiary and heterocyclic amines as for example ethyl amine, propyl amine, diethyl amine, dipropyl amine, dicyclohexyl amine, diphenyl amine, triphenyl amine, triethyl amine, myristyl diethyl amine, pyridine, cyclohexylamine, ethanolamine, aniline, tribenzyl amine, trivinyl amine, and the like. In general the hydrocarbon portions of such diluents will have up to about 20 carbon atoms. Such solvents can of course contain other substituents which are essentially non-reactive in the system and will not hinder the principal reaction desired. The ethers comprise especially preferred reaction media, particularly the polyethers, since higher yields are obtained when such are employed. Likewise the ethers more readily complex with metal organoboron compounds providing novel products which are in solution and more readily adaptable to further use than the uncomplexed metal organoboron compounds. Of the ethers the dialkyl ethers of ethylene and diethylene glycol wherein the alkyl groups contain up to about 6 carbon atoms are particularly preferred. Among such ethers the dimethyl ether of diethylene glycol and the dimethyl ether of ethylene glycol are particularly advantageous.

The proportion of solvent which is employed is subject to considerable latitude. In general between about 1 to 100 parts per part by weight of the metal organoboron hydride compound are employed. In those instances wherein a complex of the solvent with the product is achieved the solvent is used in amount at least sufficient to obtain one molecule of the solvent complexed with one molecule of the metal organoboron product.

The novel products of this invention comprise metal organoboron compounds complexed with an organic solvent capable of donating electrons to the metal organoboron compound. The ethers and amines, especially ethers of polyhydric alcohols and tertiary amines, are quite well suited for this purpose. In general, the novel compounds will comprise at least one molecule and generally not more than 4 molecules of the solvent complexed with one molecule of the metal organoboron compound. Typical but nonlimiting examples of such novel products are sodium tetraethylboron complexed with the dimethyl ether of diethylene glycol or the dimethyl ether of ethylene glycol, or diethyl ether and other monoethers, sodium borotetraethyl complexed with triethyl, trimethyl, diethyl, or tricyclohexyl amine, sodium tetraphenylboron complexed with tetrahydrofuran, sodium triethylphenylboron complexed with dioxane, sodium tetracyclohexylboron complexed with the diethyl ether of diethylene glycol, sodium tetraisobutylboron complexed with the diphenyl ether of tetraethylene glycol, sodium tetrabenzylboron complexed with diphenyl ether and the like complexes wherein other group I-A and II-A metals, other hydrocarbon groups and other ethers and amines described hereinbefore are employed in place of those in the above illustrative examples. Those compositions wherein the metal fully alkylated organoboron compound is complexed with an ether or amine resulting in a solution are preferable because of their easier handling, greater stability, and utility. The complexes of metal fully alkylated organoboron compounds with ethers of polyhydric alcohols are especially preferred because such are even more stable than complexes obtained when employing monoethers and more economical than complexed with amines. Likewise these materials are of particular advantage since they are employable in conducting reactions at higher temperatures than the uncomplexed metal organoboron materials.

The process of this invention and the novel products thereby obtained will be more completely understood from the following examples. In each instance all parts are by weight unless otherwise specified.

*Example I*

A reactor was employed which was equipped with internal agitation, external heating means, a means for admitting and discharging reactants and products and means for maintaining a pressure. To the reactor was added 160 parts of the dimethyl ether of diethylene glycol, 24.4 parts of sodium triethylborohydride, 15.4 parts of triethylborane in 40 parts of the dimethyl ether of diethylene glycol, and then the solution was agitated and heated to 145 to 150° C. Ethylene was pressurized into the reactor to between 1000 to 1040 p.s.i.g. These conditions were maintained for a period of 4¼ hours. At the end of this period the reactor was cooled and vented in a dry atmosphere and the contents washed with hexane. Two liquid layers formed. The lower phase was separated and washed with additional hexane resulting in a white precipitate. The hexane solutions were analyzed for sodium triethylborohydride content and none was detected. The solid was dried at 100° C. and 2 milliliters pressure of mercury for 1 hours. The resulting white, powdery, solid, 40 parts, representing a yield of 87 percent analyzed 5.2 percent sodium and 2.5 percent boron whereas the dimethyl ether of diethylene glycol etherate of sodium tetraethylboron contains 5.5 percent of sodium and 2.58 percent of boron. While sodium tetraethylboron sublimes at about 160° C. and 1 mm. mercury pressure, the etherate formed in this run was unaffected when subjected to these conditions.

*Example II*

The procedure of Example I was repeated with exception that the temperature was permitted to gradually rise from 29 to 87° C. at an ethylene pressure from 500 to 695 p.s.i.g. for the first 2 hours of reaction and then the mixture was reacted for 3 hours at 98 to 102° C. and 1000 to 1035 p.s.i.g. of ethylene. Upon recovering the product as in Example I an 81 percent yield of di-dimethyl ether of diethylene glycol etherate of sodium tetraethylboron was obtained.

*Example III*

The procedure of Example I was repeated with exception that 155 parts of tetrahydrofuran were substituted for the dimethyl ether of diethylene glycol with the reaction temperature at 100 to 108° C. and 990 to 1010 p.s.i.g. of ethylene with a reaction period of 5½ hours. The solid product, 16.2 parts, was vented and then resolidified at 80 to 110° C. at 1 millimeter mercury pressure. Upon analysis 12.7 percent of sodium were found which corresponds to a 50–50 mixture of tetrahydrofuran etherate of sodium tetraethylboron and sodium tetraethylboron.

*Example IV*

Again employing the procedure of Example I, the dimethyl ether of ethylene glycol was substituted for the dimethyl ether of diethylene glycol with the reaction being conducted at 100 to 107° C. and 960 to 1000 p.s.i.g. of ethylene for 4½ hours. Upon recovery of the product as in Example I and analysis, 9.58 percent of sodium was found whereas the dimethyl ether of ethylene glycol etherate of sodium borotetraethyl contains 10.0 percent of sodium. Upon dissolving the solid product in diethyl ether and evaporating the diethyl ether therefrom, analysis showed no change in the product.

*Example V*

Again employing the procedure of Example I, 24.4 parts of sodium triethylborohydride, prepared by reacting 4.8 parts of sodium hydride with 28 parts of triethylborane (0.08 mole in excess) in hexane at 80–100° C. and without separation of the excess triethylborane, were reacted with ethylene under a pressure of 490 to 510 p.s.i. at a temperature of 150 to 162° C. for 3½ hours in the presence of 155 parts of hexane. Twenty-three parts of solid product were obtained, representing a yield of 77 percent, which upon analysis contained 15 percent sodium which corresponds to 15.3 percent sodium contained in sodium tetraethylboron.

*Example VI*

The procedure of Example I was repeated with exception that diethyl ether was substituted for the dimethyl ether of diethylene glycol. The reaction temperature was 109 to 114° C. at an ethylene pressure of 500 to 520 p.s.i. for 3½ hours. When the solid ether complex produced was dried at 100° C. and 1 mm. mercury pressure, uncomplexed sodium tetraethylboron was obtained. When portions of the diethyl etherate of sodium tetraethylboron was added to benzene, and 2,2,5-trimethylhexane, solubility was exhibited whereas uncomplexed sodium tetraethylboron is insoluble in hydrocarbons.

*Example VII*

When 13.3 parts of sodium triphenylborohydride are reacted with ethylene pressurized at 5000 p.s.i.g. and 150° C. in 150 parts of diamyl ether for 2 hours employing 3 parts of triphenylborane as catalyst, the diamyl ether etherate of sodium triphenyl ethylboron is obtained.

*Example VIII*

Repeating the procedure of Example I with exception that triethylamine is substiuted for the dimethyl ether of diethylene glycol and sodium tricyclohexylborohydride is employed in place of sodium triethylborohydride with cyclohexene as the olefin, sodium tetracyclohexylboron complexed with triethylamine is obtained.

Example IX

Sodium tetraethylboron complexed with the diethyl ether of diethylene glycol is obtained in high yield and purity when Example I is repeated substituting this ether for the dimethyl ether of diethylene glycol.

Example X

Sodium tri-2-phenylethylborohydride is reacted with styrene in the presence of a minor amount of triethylaluminum for 3 hours at a temperature of 75° C. Sodium tetra(2-phenylethyl)-boron is obtained in high yield and purity. When this run is duplicated employing the dimethyl ether of tetraethylene glycol as a solvent the analogous ether complex is obtained.

Example XI

When sodium trioctylborohydride is reacted with 1-octene at 125° C. in the presence of pyridine as a solvent, and a catalytic amount of trioctylborane, sodium tetraoctylboron complexed with pyridine is obtained in high yield.

Example XII

Substituting glycerol trimethyl ether in Example I the glycerol trimethyl etherate of sodium tetraethylboron is obtained in high yield.

Example XIII

When 13.7 parts of lithium trihexylborohydride are reacted with 12.0 parts of 1 hexene in 155 parts of dioxane and in the presence of 1 part of trihexylborane as catalyst at a temperature of 30° C. for 6 hours, the dioxane etherate of lithium tetrahexylboron is produced.

Example XIV

When calcium bis-(triisopropylborohydride) is reacted with isobutylene at a temperature of 180° C. and a pressure of 5000 p.s.i.g. in toluene employing triisopropylborane as catalyst calcium bis-(isobutyltriisopropylboron) is obtained.

Example XV

Employing the procedure of Example XIV with the exception that magnesium bis-(triamylborohydride) is substituted and xylene is employed as the diluent along with pentene-1 as the olefin, magnesium bis-(tetraamylboron) is produced.

Example XVI

When sodium diethylchloroborohydride is reacted with ethylene in the presence of a catalytic amount of triphenylborane according to the procedure of Example I, employing diphenyl ether as the diluent, sodium triethylboron chloride diphenyl etherate is obtained.

Example XVII

When amyl isobutyl ether, dicyclohexyl ether, diisopropyl ether, trimethyl amine, diethyl amine, tricyclohexyl amine, triphenyl amine, and diethylboron chloride, trimethylborane, diethylaluminum hydride, triisobutylaluminum, trioctylaluminum, and ethylaluminum sesquichloride are substituted for the ethers or amines, and catalysts employed in the above examples, equally satisfactory results are obtained.

The following example will demonstrate that embodiment of this invention wherein the metal organoboron hydride is formed in situ.

Example XVIII

Employing the reactor of Example I, 4.8 parts of sodium hydride slurried in 140 parts of DMC are added to the reactor. Then 21.0 parts of triethylborane in 35 parts of dimethyl ether of diethylene glycol are added and the reactor immediately pressurized with ethylene to 1000 p.s.i.g. at room temperature without external heating. Maintaining these conditions for 3 hours the di-dimethyl ether of diethylene glycol etherate of sodium tetraethylboron is obtained in high yield.

Example XIX

Employing the procedure of Example XVIII with exception that toluene is substituted for the dimethyl ether of diethylene glycol and the temperature employed is 175° C. with the pressure at 5000 p.s.i.g., uncomplexed sodium tetraethylboron is obtained in high yield and purity.

It is to be understood that the metal hydride likewise can be prepared in situ. For example in Example XIX sodium metal can be employed and the system additionally pressurized with hydrogen with a reaction temperature of 200° C. to produce equally satisfactory results.

The above examples are presented merely by way of illustration and it is evident that other metal organoboron hydrides, olefins, catalysts, and solvents described previously can be substituted.

The temperature at which the reaction is conducted is likewise subject to considerable latitude as between about 0 to 200° C. The reaction is essentially instantaneous and exothermic. However, some advantage is obtained in increased reaction rate and yield when conducting the reaction at a temperature between about 100 to 175° C. Further, when an ether or amine is employed as a diluent and the complexes are to be prepared, it has been found that best results are obtained at a temperature between about 100 to 150° C. On the other hand, when the hydrocarbons are employed as diluents best results are obtained at temperatures between 150 to 175° C.

Pressure operation is preferably employed when the olefin is gaseous under reaction conditions. In general, pressures above atmospheric are all that are required for good operation. However, it is preferable to employ pressures between about 500 to 5000 p.s.i. when the olefin is gaseous and to maintain volatile reactants in the liquid phase.

The length of reaction time likewise is not critical since the reaction is essentially instantaneous. Ordinarily reaction times less than about 10 hours are quite adequate and preferably are retained between about ½ to 5 hours. Longer reaction times than 5 hours are to be avoided particularly at high temperatures since some degradation of the product may occur.

It is not necessary to recover the product from the reaction system since it can be employed as obtained. However, if it is desired to further purify the product, such can be readily accomplished by distillation of the solvent leaving, depending upon the solvent, the complexed or uncomplexed metal organoborane. Additionally, when the product formed is solid it can be readily removed from the system by filtration. Other general recovery techniques are equally applicable.

The products of this invention are of considerable utility. They can be employed in polymerization reactions as catalysts. An example is the polymerization of polyethylene employing sodium tetraethylboron as a catalyst. They are also excellent as alkylating agents. One such use is their reaction with, for example, a lead halide or lead salt of an organic acid to produce tetraorganolead products. In this particular utility the ether complexed metal organoborane compounds are especially suitable and unique by virtue of the greater stability of the compound, easier handling, higher temperatures possible and higher reactivity. The complexes are likewise easier to handle than the uncomplexed compounds since they are less susceptible to atmospheric degradation. Another use of the products of this invention is as reducing agents for various organic compounds. These and other uses will be evident to those skilled in the art.

Having thus described the process of this invention and the products thereby produced, it is not intended that it be limited except as set forth in the following claims.

I claim:
1. The process which comprises reacting a metal hydrocarbon boron hydride compound wherein the metal is selected from the group consisting of alkali and alkaline earth metals and the hydrocarbon group contains up to about 10 carbon atoms and is selected from the group consisting of alkyl, cycloalkyl, and aryl radicals with an alpha-olefin in the presence of a trihydrocarbon group III–A metal catalyst wherein the hydrocarbon groups are selected from the group consisting of alkyl, cycloalkyl, and aryl radicals containing up to about 18 carbon atoms to form a metal hydrocarbon boron compound having at least one more hydrocarbon radical bonded to the boron than does said metal hydrocarbon boron hydride.

2. The process of claim 1 wherein said metal hydrocarbon boron hydride compound is an alkali metal trihydrocarbon boron hydride, said olefin is a straight chain alpha-olefin having up to about 6 carbon atoms and said catalyst is a trialkyl boron compound.

3. The process for the manufacture of sodium tetraethylboron which comprises reacting sodium triethylborohydride with ethylene in the presence of a minor amount of triethylborane and in the further presence of the dimethyl ether of diethylene glycol at a temperature between about 100 to 150° C. and a pressure above atmospheric.

4. As a new composition of matter, metal tetraalkyl boron compounds wherein the metal is selected from the group consisting of alkali and alkaline earth metals and the alkyl groups contain up to about 10 carbon atoms complexed with an organic solvent capable of donating electrons and selected from the group consisting of hydrocarbon ethers and hydrocarbon amines.

5. Sodium tetraethylboron complexed with the dimethyl ether of diethylene glycol.

6. The process of claim 1 wherein said alkali metal trihydrocarbon boron hydride compound is a sodium trialkylboron hydride and the reaction is conducted at a temperature between about 100 to 150° C. and a pressure above atmospheric.

7. The composition of claim 1 wherein the metal of said metal tetraalkyl boron compound is an alkali metal and said complexing organic solvent is a hydrocarbon ether.

References Cited in the file of this patent
UNITED STATES PATENTS
2,944,084  Blitzer et al. _____ July 5, 1960

OTHER REFERENCES
Nesmeyanov et al.: Chem. Abstracts, vol. 50, page 1644 (1956).
Nesmeyanov et al.: Chem. Abstracts, vol. 50, page 1646 (1956).
Chu et al.: J. Am. Chem. Soc., vol. 78, pages 3610–12 (1956).
Crane, Jr.: Anal. Chem., vol. 28, pages 1794–7 (1956).
Lappert: Chemical Reviews, vol. 56, pages 1037–8 (1956).
Kruerke: Chem. Abstracts, vol. 51, page 9512 (1957).

UNITED STATES PATENT OFFICE
CERTIFICATE OF CORRECTION

Patent No. 3,055,945                          September 25, 1962

Julian B. Honeycutt, Jr.

It is hereby certified that error appears in the above numbered patent requiring correction and that the said Letters Patent should read as corrected below.

Column 3, line 48, for "recoverably" read -- recoverable --; column 5, line 66, for "hours" read -- hour --; column 10, line 5, for the claim reference numeral "1" read -- 2 --; line 10, for the claim reference numeral "1" read -- 4 --.

Signed and sealed this 1st day of October 1963.

(SEAL)
Attest:

ERNEST W. SWIDER

Attesting Officer

DAVID L. LADD

Commissioner of Patents